April 9, 1940.  R. E. BURK ET AL  2,196,177

PRODUCTION OF ALCOHOLS FROM OLEFINS

Filed Oct. 15, 1936

INVENTORS
Robert E. Burk and
BY  Herman P. Lankelma
Fay, Oberlin & Fay ATTORNEYS Patented Apr. 9, 1940

2,196,177

UNITED STATES PATENT OFFICE 2,196,177

PRODUCTION OF ALCOHOLS FROM OLEFINS

Robert E. Burk and Herman P. Lankelma, Cleveland, Ohio, assignors to The Standard Oil Company, Cleveland Ohio, a corporation of Ohio Application October 15, 1936, Serial No. 105,836

13 Claims. (Cl. 260—639)

In our application Serial No. 60,484 (now Patent No. 2,109,462), filed January 23, 1936, of which the present application is a continuation in part and as to common subject matter, there is set forth the treating of olefins with sulphuric acid, and separating the formed esters by a selective solvent and hydrolyzing to alcohols by a limited amount of water and sub-atmospheric pressure. The present invention involves a modification which is of especial advantage under certain circumstances.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

Figure 1:
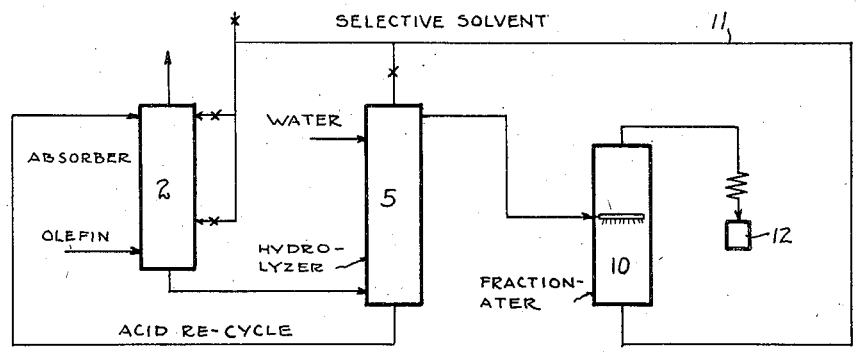
Figure 2:
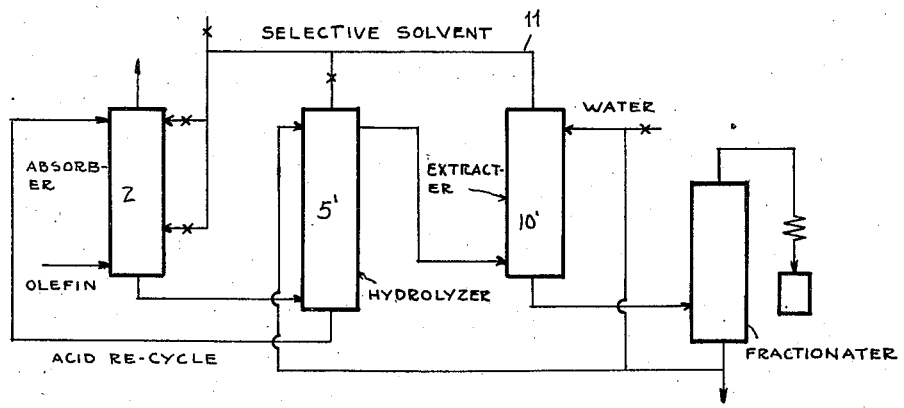

In said annexed drawing:

Figs. 1 and 2 are schematic illustrations of embodiments of the invention.

The olefins, as ethylene, propylene, butylene, etc., or mixtures, are subjected to the action of sulphuric acid of suitable concentration, for instance 66° Bé. If mixed olefin gases are employed, desirably the absorption is carried out in successive stages, each operating upon the gas under conditions preferential to the absorption of the iso-butylene, then the propylene, butene-1, and butene-2, and finally the ethylene, in succession. During the absorption in the acid or esterification stage, or at least in the final portion of the absorption zone there may be present a selective solvent for the ester formed. For instance, decahydronaphthalene, naphthenes, etc., are suitable, having preferential solvency for alkyl ester, and being also sufficiently immiscible with water to be easily handled and separated or certain petroleum cuts such as varnolene may be used. Thus, as illustrated in the drawing, the olefin, for example ethylene may enter the lower portion of the absorption zone 2, and pass countercurrently to the absorbing sulphuric acid, while at the same time the selective ester solvent, "varnolene" (i. e., petroleum naphtha used by paint-makers) for instance, is supplied in contact. The sulphuric acid or absorbing liquor is in the beginning relatively pure sulphuric acid, but with progress of the reaction includes alkyl hydrogen sulphate, dialkyl sulphate, and small amounts of alcohol, hydrocarbon, etc. The liquor can be then hydrolyzed directly or it can be extracted with a solvent and the esters contained in the solvent then be hydrolyzed. The ester is taken up by its solvent as formed, and thereby shielded from over-action of the acid. Separating from the acid liquor, and passing from the absorption zone, the selective solvent carrying the ester proceeds to the hydrolyzing zone 5 where it is contacted with water for hydrolysis, preferably in countercurrent flow. The amount of water is carefully limited with relation to the ester supply, and may be introduced in the hydrolyzing zone as relatively pure water or as a solution in water of alkyl sulphate, alkyl sulphuric acid, with traces of sulphuric acid or as acidulated with hydrochloric acid. The water in the hydrolyzing zone is maintained below steaming or vaporization, although preferably near to the temperature of boiling, and where a contact tower is employed as the hydrolyzing zone, as desirable, there may be atmospheric pressure or at least sufficient pressure to prevent vaporization of the water. In this way the temperature is maintained high enough for efficient hydrolysis, as would not be the case if vaporization were restrained by lowering the temperature. With a tower of relatively small cross section, and proper restriction of the water feed to the ester feed, a relatively small amount of water accomplishes a large amount of hydrolyzation, and with countercurrent flow there passes from the bottom of the hydrolyzing zone or tower sulphuric acid which is in suitable concentration to return to absorb fresh olefins in the absorption zone 2. In the hydrolyzing zone there is present also a selective solvent for the alcohol as formed, and by employment of such solvent as is at the same time sufficiently immiscible with water, a ready separation is had, and there passes from the top of the hydrolyzing zone or tower a solution of the alcohol in the selective solvent. Most conveniently, the selective solvent employed at this stage is one which can also be operated in the acid-absorber zone, and by employing such agent as "varnolene" or decahydronaphthalene, the dual function is here available that the selective solvent after having served to pick out and carry the ester, after having it hydrolyzed out, picks up and carries the alcohol formed. The selective solvent solution of alcohol thus passes from the hydrolyzing zone to a separating zone where the alcohol is stripped from the solvent, and the latter is available to be returned again back to the preceding zone.

As a further assistance in the direction of effective removal of the alcohol from the acid liquor in the hydrolyzing zone, it is of advantage in some instances to have components present acting to salt out the alcohol. For example, inorganic sulphates, such as sodium sulphate and the like, may be added in the hydrolyzing zone to considerable concentration.

For the removing the alcohol from the solvent, as it comes from the hydrolyzing zone, a convenient operation is to pass the solvent mixture of alcohol to spray into the vacuum fractionating equipment 10, Fig. 1, wherein the decahydronaphthalene or whatever selective solvent is used, as the alcohol vaporized out, is returned by the line 11 back to the absorption zone, while the alcohol vapor is condensed and collected in the receiver 12. Preferably however, with advantage under some circumstances, the solution of alcohol in the selective solvent, as leaving the hydrolyzing zone 5', Fig. 2, is passed into countercurrent contact with a limited feed of water, in extraction tower 10', the water having preferential affinity for the alcohol and stripping it from the solvent which as immiscible and separating, is taken from the top to return to the absorption zone, while the aqueous alcohol solution proceeds to concentrating distillation equipment or other disposal as desired. By careful control of the amount of water supply in the stripping zone, a rather strong aqueous solution of alcohol is obtained, requiring relatively little concentration.

Other modes of applying the principle of the invention may be employed, change being made as regards the details described, provided the features stated in any of the following claims, or the equivalent of such, be employed.

We therefore particularly point out and distinctly claim as our invention:

1. A process of making alcohols from olefins, which comprises absorbing the olefins in sulphuric acid liquor in the presence of a solvent selective for ester and being immiscible with water, passing the selective solvent solution of ester in counter current contact with a supply of water which is not substantially in excess over hydrolytic requirement and held below vaporization by application of pressure, then in the presence of salting-out material comprising essentially sodium sulphate absorbing the thereby formed alcohol into the solvent which had carried the ester, spraying the solvent solution of alcohol into a flash distillation separating zone, and returning the solvent therefrom to absorb fresh ester and the acid to absorb fresh olefin.

2. A process of making alcohols from olefins, which comprises absorbing the olefins in sulphuric acid followed by extraction with a solvent selective for ester and being immiscible with water, passing the selective solvent solution of ester in counter current contact with a supply of water which is not substantially in excess over hydrolytic requirement and held below vaporization by application of pressure, then in the presence of salting-out material comprising essentially sodium sulphate absorbing the thereby formed alcohol into the solvent which had carried the ester, passing the solvent solution of alcohol in counter current contact with water which selectively extracts the alcohol, and returning the solvent to absorb fresh ester and the acid to absorb fresh olefins.

3. A process of making alcohols from olefins, which comprises absorbing the olefins in sulphuric acid in the presence of a solvent selective for ester and being immiscible with water, passing the selective solvent solution of ester in counter current contact with a supply of water at elevated temperature and held below vaporization, in the presence of sodium sulphate absorbing the thereby formed alcohol into the solvent which had carried the ester, separating the alcohol from the solvent, and returning the solvent to absorb fresh ester and the acid to absorb fresh olefin.

4. A process of making alcohols from olefins, which comprises absorbing the olefins in sulphuric acid in the presence of a solvent selective for ester and being immiscible with water, passing the selective solvent solution of ester in counter current contact with a supply of water at elevated temperature and held below vaporization, absorbing the thereby formed alcohol into the solvent which had carried the ester, spraying the solvent solution of alcohol into a flash distillation separating zone, and returning the solvent therefrom to absorb fresh ester and the acid to absorb fresh olefin.

5. A process of making alcohols from olefins, which comprises absorbing the olefins in sulphuric acid in the presence of a solvent selective for ester and being immiscible with water, passing the selective solvent solution of ester in counter current contact with a supply of water at elevated temperature and held below vaporization, absorbing the thereby formed alcohol into the solvent which had carried the ester, passing the solvent solution of alcohol in counter current contact with water which selectively extracts the alcohol, and returning the solvent to absorb fresh ester and returning acid from the bottom of the hydrolysis water zone to absorb fresh olefins.

6. A process of making alcohols from olefins, which comprises absorbing the olefins in sulphuric acid, adding water to the liquor, passing the liquor in counter current contact with a solvent immiscible therewith and substantially unattacked thereby, absorbing the thereby formed alcohol in said selective solvent, spraying the solvent solution of alcohol into a flash distillation separating zone, and returning the solvent to the process.

7. A process of making alcohols from olefins, which comprises absorbing the olefins in sulphuric acid, adding water to the acid liquor, passing the liquor in counter current contact with a solvent immiscible therewith under conditions of pressure to keep the water below vaporization point, absorbing the thereby formed alcohol in said selective solvent, passing the solvent solution of alcohol in contact with water which selectively extracts the alcohol, and returning the solvent to the process.

8. A process of making alcohols from olefins, which comprises absorbing the olefins in sulphuric acid, adding water thereto, passing the liquor in counter current contact with a solvent immiscible therewith under conditions of pressure to maintain the water below vaporization point, absorbing the thereby formed alcohol in said selective solvent, separating the alcohol from the solvent, and returning the solvent to the process.

9. A process of making alcohols from olefins, which comprises absorbing the olefins in sulphuric acid, passing the formed ester and liquor into a hydrolzing zone in contact with a supply of water which is not in substantial excess over hydrolytic requirement and held below vaporization point by application of pressure, and salting out the alcohol by the presence of sodium sulphate, selectively extracting the alcohol in the solvent, removing the alcohol from the solvent, and returning the solvent to the process.

10. A process of making alcohols from olefins, which comprises absorbing the olefins in sulphuric acid, passing the formed ester acid liquor into a hydrolyzing zone in counter current contact with a supply of water below vaporization point by application of pressure, and salting out the alcohol by sodium sulphate in the presence of a selective solvent for alcohols.

11. A process of making alcohols from olefins, which consists in absorbing the olefins in sulphuric acid, and passing the formed ester acid liquor into a hydrolyzing zone in contact with a supply of water not in substantial excess of hydrolytic requirement while inhibiting vaporization of such water by maintaining super-atmospheric pressure.

12. A process of making alcohols from olefins, which comprises absorbing the olefins in sulphuric acid, adding water, passing the ester acid liquor in counter current contact with a solvent immiscible therewith under conditions of pressure to maintain the water below vaporization point, and extracting the alcohol from the acid liquid substantially as fast as formed.

13. A process of making alcohols from olefins, which comprises absorbing the olefins in sulphuric acid, and passing the mixture containing formed ester with a supply of water not in substantial excess of hydrolytic requirement and held below vaporization point by application of pressure, in contact with a selective solvent for alcohol from the acid liquor.

ROBERT E. BURK.
HERMAN P. LANKELMA.